United States Patent [19]

Gray, Jr. et al.

[11] Patent Number: 5,507,144
[45] Date of Patent: Apr. 16, 1996

[54] LIGHTWEIGHT, SAFE HYDRAULIC POWER SYSTEM AND A METHOD OF OPERATION THEREOF

[75] Inventors: Charles L. Gray, Jr., Pinckney; Michael J. Safoutin, Ann Arbor, both of Mich.

[73] Assignee: The United States of America as represented by the Administrator of the U.S. Environmental Protection Agency, Washington, D.C.

[21] Appl. No.: 429,617

[22] Filed: Apr. 27, 1995

[51] Int. Cl.$^6$ ............... F16D 31/00; F15B 21/04
[52] U.S. Cl. ............... 60/327; 60/415; 60/416; 91/4 R
[58] Field of Search ............ 91/4 R, 5; 60/413, 60/416, 408, 493, 415, 327, 484, 486, 414

[56] References Cited

U.S. PATENT DOCUMENTS

| | | | |
|---|---|---|---|
| 3,100,965 | 8/1963 | Blackburn | 91/4 R X |
| 4,098,144 | 7/1978 | Besel et al. | 60/416 X |
| 4,674,280 | 6/1987 | Stuhr | 60/414 X |
| 4,731,991 | 3/1988 | Hagin | 60/416 |

FOREIGN PATENT DOCUMENTS

| | | | |
|---|---|---|---|
| 3828642 | 3/1989 | Germany | 60/413 |
| 1455055 | 1/1989 | U.S.S.R. | 60/413 |

*Primary Examiner*—Edward K. Look
*Assistant Examiner*—Hoang Nguyen
*Attorney, Agent, or Firm*—Lorusso & Loud

[57] ABSTRACT

A hydraulic accumulator system alternately stores energy in the form of gas pressure and converts the stored energy into work by gas expansion. The hydraulic accumulator system, by connection to drive wheels of a vehicle, can serve as a hydropneumatic powertrain for the vehicle. High-pressure and low-pressure fluid drive units are operable either in a motor mode or in a pump mode. A plurality of high-pressure liquid vessels and a plurality of low-pressure liquid vessels are connected in parallel between the fluid drive units and a gas reservoir, with the high-pressure fluid drive unit connecting with the high-pressure liquid vessels and the low-pressure fluid drive unit connecting with the low-pressure liquid vessels. A liquid reservoir supplies liquid to the fluid drive units when operating in the pump mode and receives liquid from the fluid drive units operating in a motor mode. A method of operating the system is also disclosed herein.

9 Claims, 4 Drawing Sheets

LIGHTWEIGHT, SAFE HYDRAULIC POWER SYSTEM AND A METHOD OF OPERATION THEREOF

BACKGROUND OF THE INVENTION

1. Field of the Invention

The present invention is in the field of hydraulic accumulator systems and more specifically, but not limited to, hydraulic hybrid powertrains for motor vehicles.

2. Prior Art

Hydraulic accumulators typically operate over pressure ranges between about 1,000 psi and up to 5,000 psi or greater. Conventional accumulators are composed of a single vessel that accommodates both the charge gas (the "gas side") and the fluid (the "fluid side"). The entire vessel must be strong enough to accommodate the maximum anticipated pressure, although this pressure is only attained when the accumulator is near its full fluid capacity. As fluid is discharged from this maximum pressure state, pressure declines rapidly after only a fraction of the fluid volume has passed out, and throughout the rest of the discharge cycle the pressure is much lower than the maximum pressure. In other words, the single-vessel design of conventional accumulators requires that the entire volume of the vessel be designed to withstand the maximum pressure, rather than only the volume of the working fluid that is actually discharged at that pressure. Over the greater part of its duty cycle, a conventional single-vessel accumulator is essentially over-designed, increasing its weight and cost.

Having all of the fluid and charge gas contained in a single vessel maximizes the severity of a catastrophic event such as a rupture. If a rupture were to occur in a conventional accumulator, the energy contained in the entire charge of fluid and gas could be released at once in a rapid and uncontrollable manner. A rupture of any portion of the vessel could result in failure of the entire system.

While not a common or widespread practice, accumulator systems have been built by connecting a gas pressure vessel, acting as the gas side, to another pressure vessel that serves as the fluid side. This separates the gas and fluid sides, but does not address the problem of the mismatch between vessel strength and the average actual pressure experienced. Thus it does not lead to significant weight or cost reductions. While the severity of a rupture would be reduced somewhat by having the gas and fluid systems in two separate packages by adding a shut-off valve between the two vessels, the entire gas charge or the entire fluid charge would still be involved in case of a rupture, which could still cause significant damage.

SUMMARY OF THE INVENTION

Accordingly, it is an object of the present invention to improve the safety and practicality of hydraulic hybrid powertrains and thereby improve fuel utilization efficiency and reduce emission of $CO_2$ and other pollutants.

In accordance with the foregoing objective, the present invention provides a hydraulic accumulator system for alternately storing energy in the form of gas pressure and converting that stored energy into work by gas expansion. The hydraulic accumulator system of the present invention includes a high-pressure reversible fluid drive unit operable in a motor mode and in a pump mode. At least one gas pressure storage vessel is connected to a bank of high-pressure liquid vessels which, in turn, are connected in parallel between the high-pressure reversible fluid drive unit and the gas pressure storage vessel. The hydraulic accumulator system further includes a low-pressure reversible fluid drive unit operable in either a motor mode or in a pump mode. The low-pressure reversible fluid drive unit has a peak efficiency at a discharge pressure head substantially below the discharge pressure head for peak efficiency of the high-pressure reversible fluid drive unit. The hydraulic accumulator system further includes a bank of low-pressure liquid vessels connected in parallel between and providing fluid communication between the low pressure fluid drive unit and the gas pressure storage vessel. A liquid reservoir is provided for receiving fluid from the first and second fluid driving units operating in a motor mode and for supplying liquid to the liquid vessels, through the first or second fluid drive units operating in a pump mode. A single reversible fluid drive unit which can operate over the entire pressure range may also be used in place of more highly optimized multiple drive units.

In another aspect, the present invention provides a method for producing work involving use of a first reversible pump/motor operating as a pump to pump liquid from a liquid reservoir into, successively, a plurality of parallel liquid vessels, filling a first of the liquid vessels while raising the pressure within that first liquid vessel from a first pressure to a second pressure, higher than the first pressure, and then filling a second liquid vessel to a third pressure higher than the second pressure. By filling the liquid vessels, gas is displaced from the liquid vessels into a gas reservoir and compressed therein. Reversing the pump/motor for operation as a motor, while allowing the compressed gas from the gas reservoir to expand, forces liquid from the second liquid vessel and then, in succession, from the first liquid vessel, through the first reversible pump/motor to drive it in a motor mode to produce work. In a preferred embodiment, the drive wheels of a vehicle are driven by the work so produced and, upon braking the pump/motor is switched for operation as a pump to store energy as gas pressure within the gas reservoir, i.e. to provide for regenerative braking.

Thus, the invention is a hydraulic accumulator system and powertrain incorporating one or more gas pressure vessels and several liquid pressure vessels, with each liquid pressure vessel optimized for a specific pressure range within the broader range of pressure normally experienced by a conventional accumulator. This allows a close match between the designed strength of each vessel and the pressure cycle that it actually experiences and allows the option of significantly reducing the volume of hydraulic fluid that would normally be required for a conventional accumulator of the same capacity, all leading to reductions in weight and cost. The resulting design also leads to improvements in safety.

The invention physically separates the gas and liquid sides of the accumulator, and further divides each gas and liquid side into a number of subportions, with the liquid side optimized for different pressure ranges. The gas and liquid sides are separated by shut-off valves, and each subportion is isolated from the others in the event of rupture through automatic shut-off valves in the connecting lines.

In the method of the present invention the system starts out from a high pressure state and fluid is discharged from the highest-pressure liquid vessel to drive the high-pressure pump/motor. Shut-off valves (e.g., computer controlled) keep the other liquid vessels from being exposed to the highest-pressure levels. As the initial liquid vessel discharges, system pressure declines to a lower value. After the first liquid vessel has discharged, the second liquid vessel, optimized for the next lower pressure range, is engaged while the first liquid vessel, now empty of liquid, becomes part of the gas side. Discharge of the second liquid vessel reduces system pressure to yet a lower value, until the third and finally the fourth liquid vessels are successively engaged in the same manner as the first two, but driving the low-pressure pump/motor. In this manner, the invention assures that the active pump/motor is matched to the pressure of the fluid leaving the system, and that the strength of the vessels containing the fluid are matched to the pressure of the gas they experience. This optimization leads to reductions in component weight and cost since not all of the components have to be built to withstand the maximum system pressure.

At any time, if regenerative braking becomes available, the pump/motor that is currently engaged begins charging the liquid vessel that had been driving it, and as system pressure increases beyond the pressure range of that vessel (i.e., as the vessel is filled), fluid is directed to the next higher-pressure liquid vessel. As long as regenerative braking is available this would continue until the highest-pressure liquid vessel is charged. Routine charging of the system, for example, as by an internal-combustion engine driving the pump/motors, would take place in the same manner.

In the case of rupture of any gas-containing pressure vessel (only the pressurized gas contains stored energy), a shut-off valve is automatically engaged to isolate that vessel and prevent the wholesale discharge of energy. If rupture in a liquid vessel should occur, the liquid vessel is also automatically isolated from the rest of the system by a shut-off valve.

BRIEF DESCRIPTION OF THE DRAWINGS

In the drawings:

FIG. 4 is a schematic diagram of the third embodiment of the system of the present invention with charging of liquid into vessel 4a.

DESCRIPTION OF THE PREFERRED EMBODIMENTS

Figure 1:
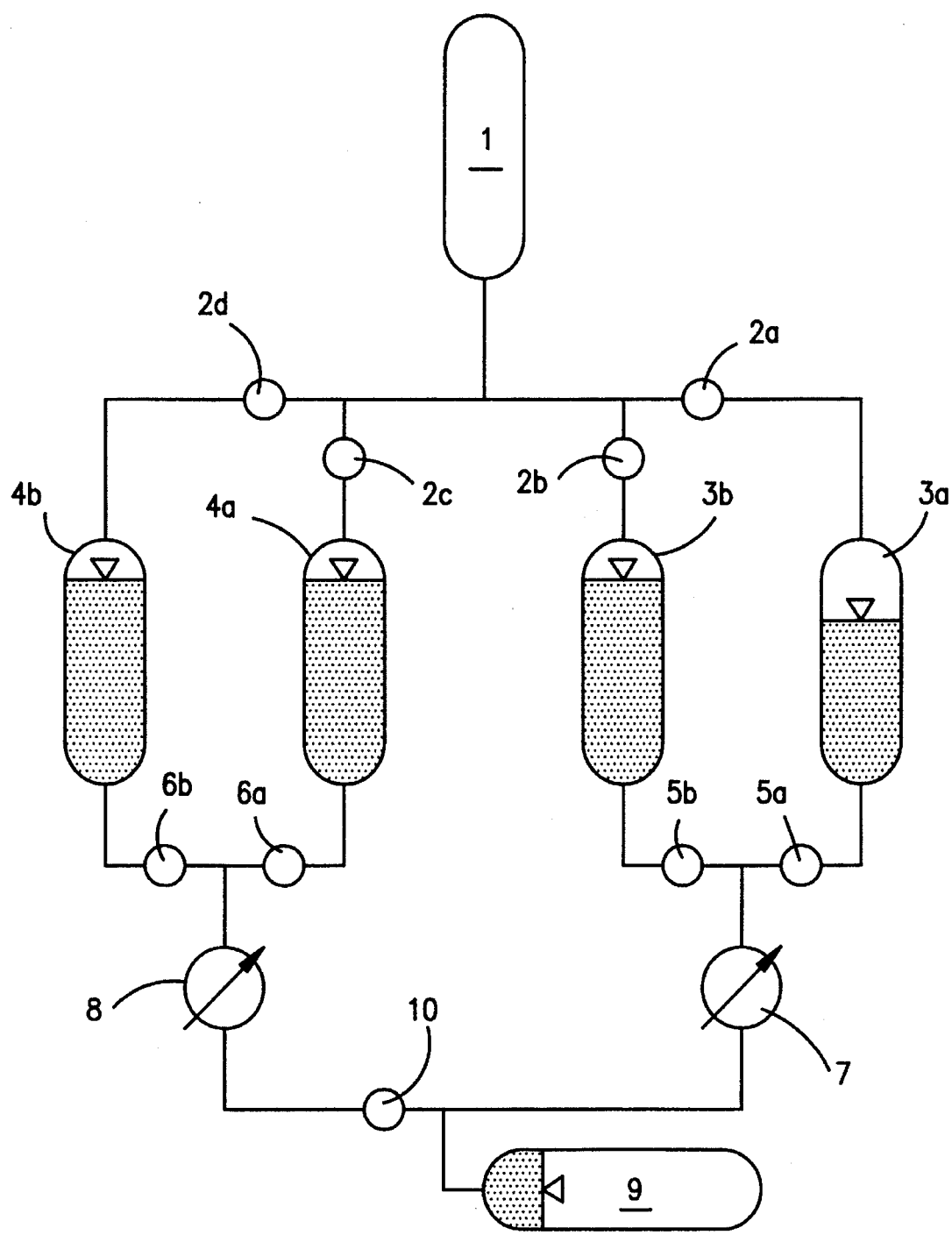
FIG. 1 is a schematic diagram of a first embodiment of the system of the present invention.

FIG. 1 illustrates a preferred embodiment of the present invention as applied to a passenger vehicle. In the embodiment described in FIG. 1, the gas side is a single vessel while the liquid side is comprised of four liquid vessels 3a, 3b, 4a and 4b, each of which is designed for a narrower pressure range than the pressure range experienced for a single liquid pressure vessel. For example, if the overall pressure range for the system is from 5000 psi to 1000 psi, vessel 3a would be optimized for the pressure range 5000 psi to 4000 psi, vessel 3b for the pressure range 4000 psi to 3000 psi, vessel 4a for 3000 psi to 2000 psi and vessel 4b for 2000 psi to 1000 psi. Two pump/motors 7 and 8 are driven by the liquid vessels, pump/motor 7 being connected to the two higher-pressure liquid vessels 3a and 3b (forming a high-pressure bank) and pump/motor 8 being connected to the lower pressure vessels 4a and 4b (forming a low-pressure bank). The pump/motor 7 driven by the high pressure bank is optimized for high pressure (3000–5000 psi) operation, while the pump/motor 8 driven by the low-pressure bank is optimized for low pressure (1000–3000 psi) operation. The volume of each vessel could be determined by these pressure specifications in conjunction with the compressibility of the charge gas and the volume of the gas vessel. In FIG. 1, the system is depicted in a pressure state between 4000 psi and 5000 psi, since liquid vessel 3a appears active (either discharging or being charged), and all other liquid vessels are fully charged.

When the system shown in FIG. 1 is at its fully charged state, the gas vessel 1 is at its highest pressure $P_{MAX}$. When power is demanded from the system, pressurized gas from gas vessel 1 is initially conducted through open valve 2a into the gas side of the highest-pressure liquid vessel 3a, while valves 2b, 2b, 2d, 5b, 6a and 6b remain shut. As gas enters liquid vessel 3a, fluid is displaced through open valve 5a, to drive high-pressure pump/motor 7, and into the low-pressure reservoir 9. A valve 10 may optionally be added to allow pump/motor 8 to be isolated from the high pressure range of pump/motor 7 and thus allow further weight savings. By the time all of the working fluid in liquid vessel 3a has been displaced, system pressure has declined from the maximum pressure $P_{MAX}$ to an intermediate pressure $P_{3a}$, defining the pressure range $PR_{MAX-3a}$ for which the liquid vessel 3a has been optimized. At this point system pressure descends into the next-highest pressure range as liquid vessel 3a becomes part of the gas-side volume, and valve 5a is shut-off. Liquid vessel 3b is then activated by the opening of valves 2b and 5b. Discharge of fluid from liquid vessel 3b proceeds through pump/motor 7 and into reservoir 9 until its working fluid has been exhausted, at which point system pressure has declined from $P_{3a}$ to $P_{3b}$, which defines pressure range $PR_{3a-3b}$ for which liquid vessel 3b has been optimized. High-pressure pump/motor 7 is optimized for the pressure range from $P_{MAX}$ to $P_{3b}$.

As pressure declines below $P_{3b}$, liquid vessels 4a and 4b come into play in the same straightforward sequential manner as 3a and 3b described above, as the system pressure declines through pressure ranges $PR_{3b-4a}$ and $PR_{4a-4b}$. However, high-pressure pump/motor 7 is no longer optimal at these lower pressures and so liquid vessel 4a and 4b are instead connected to low-pressure pump/motor 8, which is optimized for the pressure ranges $PR_{3b-4a}$ and $PR_{4a-4b}$. When liquid vessel 4a has fully discharged its working fluid, system pressure has declined from $P_{3b}$ to $P_{4a}$, defining the pressure range $PR_{3b-4a}$. When liquid vessel 4b has discharged its working fluid, system pressure has declined from $P_{4a}$ to $P_{4b}$, the lowest working pressure of the system. $P_{4a}$ and $P_{4b}$ define the lowest working pressure range $PR_{4a-4b}$. At $P_{4b}$ the system is fully discharged.

Regenerative braking may become available at any time in this process. When this occurs, power is no longer demanded of the system and the active pump/motor becomes free to operate as a pump. Supposing that regenerative braking becomes available at the lowest system pressure $P_{4b}$, then the low pressure pump/motor 8 is the active pump/motor. The active pump/motor 8 is switched to operate as a pump, pumping fluid from the low-pressure reservoir 9 through valve 6b into liquid vessel 4b, while valves 6a, 5b, and 5a remain shut. The fluid entering vessel 4b displaces gas through open valve 2d into gas vessel 1 (and into the gas-containing liquid vessels 4a, 3b and 3a), causing system pressure to rise from $P_{4b}$ to $P_{4a}$. As system pressure approaches $P_{4a}$, liquid vessel 4b becomes full and liquid vessel 4a comes into play. Valves 2d and 6b are closed, valve 6a is opened, and fluid begins flowing to liquid vessel 4a as system pressure rises from $P_{4a}$ toward $P_{3b}$. As $P_{3b}$ is approached, liquid vessel 4a becomes full, valves 2c and 6a are closed, and valve 5b, is opened. Now the pressure is high enough to involve high-pressure pump/motor 7, which is set to pump mode replacing pump/motor 8. As long as regenerative braking is available, pressurization may continue in the same straightforward manner until the last liquid vessel 3a has been filled and system pressure has reached $P_{MAX}$.

The system may also be charged by power from an internal combustion engine or other device instead of regenerative braking. For example, the present accumulator system could be substituted for the single pump/motor and single accumulator of the embodiment disclosed in copending U.S. application Ser. No. 07/253,944, filed Jun. 3, 1994 and entitled "HYBRID POWERTRAIN VEHICLE," the teachings of which are incorporated herein by reference.

In the case of rupture of any gas-containing vessel, all of the exposed valves are designed to shut off in response to unusually high gas or fluid flow.

Figure 2:
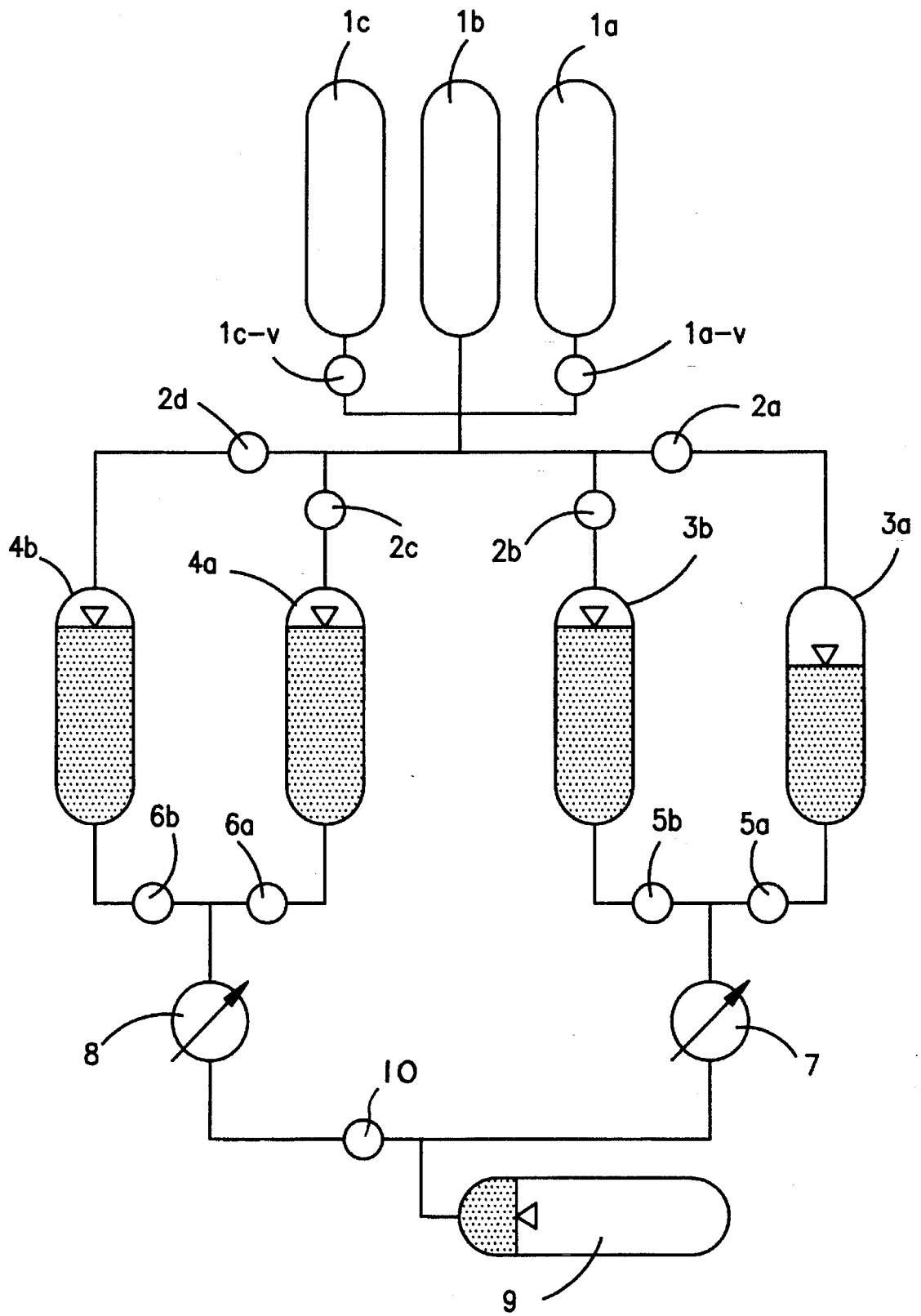
FIG. 2 is a schematic diagram of a second embodiment of the system of the present invention.

Various modifications of the embodiment of FIG. 1 are possible within the scope of the present invention. For example, the embodiment described above could include more than one gas vessel (See the embodiment of FIG. 2, for example) for improved safety. More or fewer than four liquid vessels or more or fewer than two pump/motors could also be employed. The pump/motor(s) can be any of several types, e.g. swash plate, bent axis, and others. Any of these modifications of the embodiment of FIG. 1 could be made without departing from the spirit of the invention or the scope of the claims.

Figure 3:
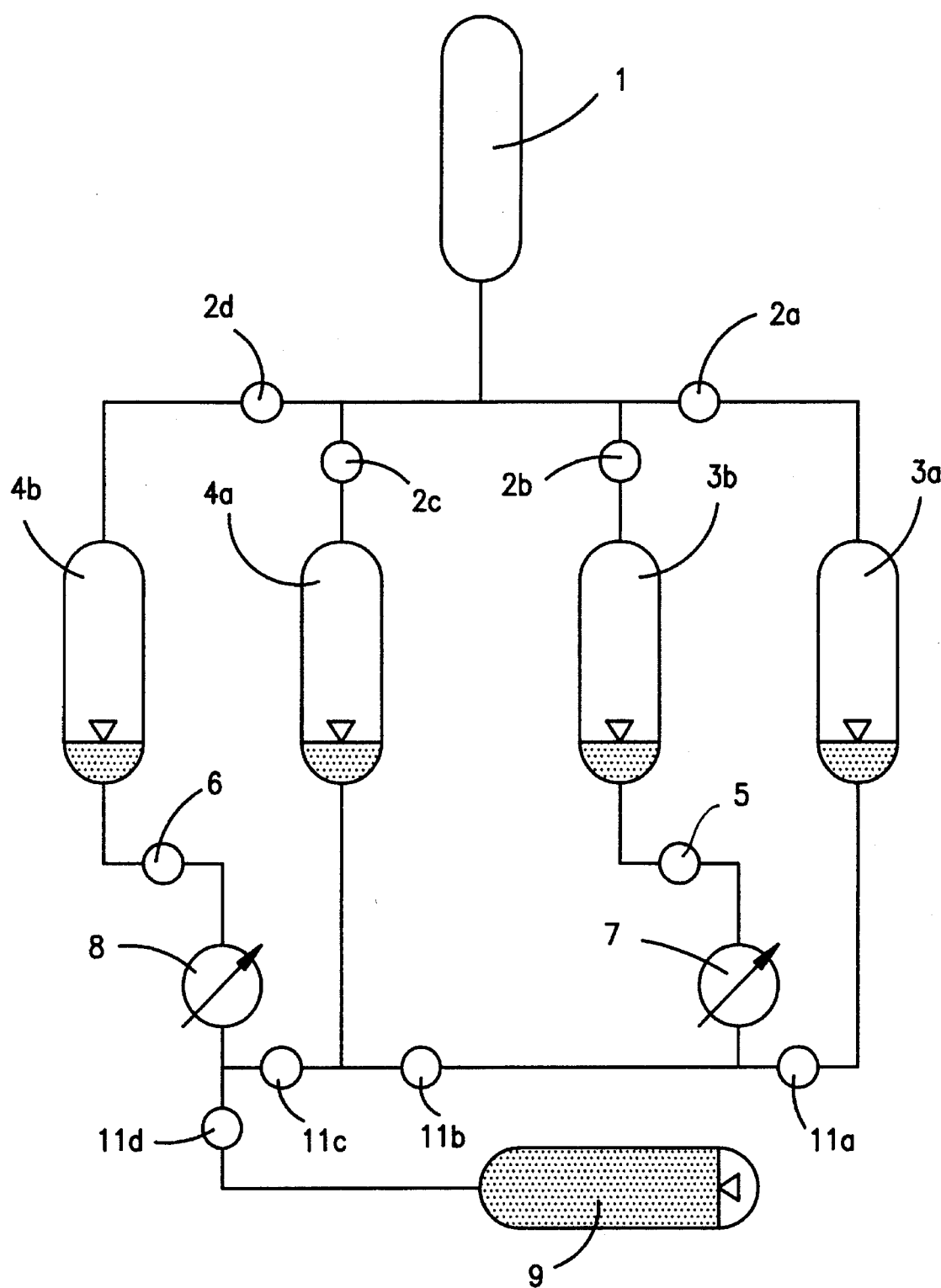
FIG. 3 is a schematic diagram of a third embodiment of the system of the present invention in a fully discharged state.
Figure 4:
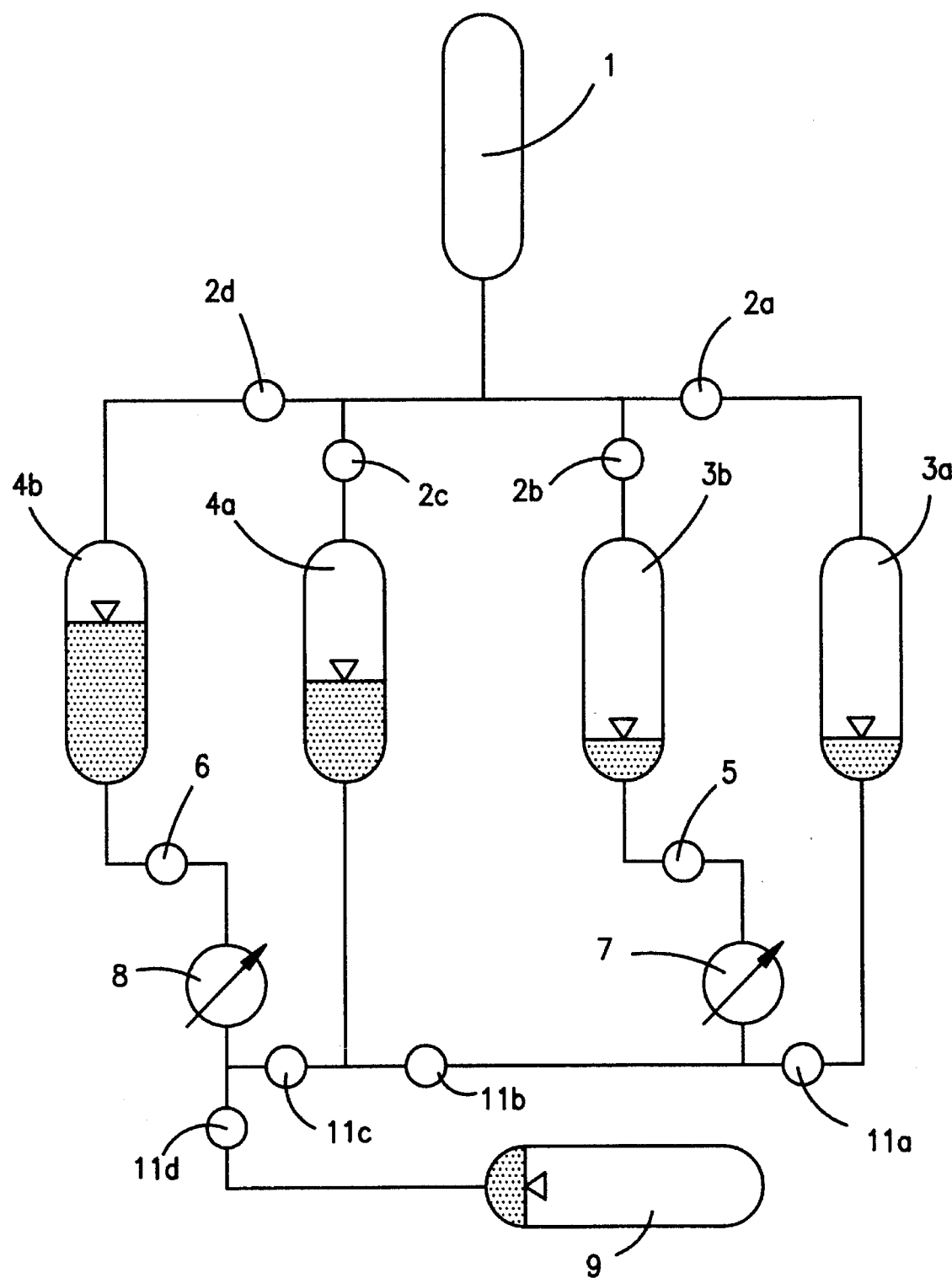

A third embodiment is shown in FIGS. 3 and 4. This embodiment provides additional reductions in weight and cost through the reduction in the volume (and therefore weight) of liquid hydraulic fluid and in the size of the low-pressure reservoir.

In the case illustrated with four liquid vessels of equal size, the volume of hydraulic fluid is reduced by almost a factor of four as compared to a conventional accumulator of equal capacity. This reduction in volume of required hydraulic fluid is achieved by a novel "reusing" of the hydraulic fluid through each of the liquid pressure stages of the multiple liquid vessel design. A reduced hydraulic fluid volume also proportionately reduces the size needed in the low-pressure reservoir.

FIG. 3 illustrates the third embodiment in the fully discharged state with all of the working hydraulic fluid contained in the low-pressure reservoir 9. As the charging of the accumulator system begins, fluid from low-pressure reservoir 9 passes through open valve 11d, through pump/motor 8 acting as a pump and through open valve 6 into liquid vessel 4b. Valves 11c, 11b, 11a and 5 remain shut. Valves 2a, 2b, 2c and 2d are open, and would operate as described in the first embodiment depicted in FIG. 1. After liquid vessel 4b is fully charged and low-pressure reservoir 9 is depleted, valves 2d and 11d are shut and valve 11c is opened. Pump/motor 8 acting as a pump with reversing fluid flow (by reversing direction of rotation, over-center setting, switching valves, or other means) receives fluid from liquid pressure vessel 4b and charges liquid pressure vessel 4a through open valve 11c (see FIG. 4). The compressed gas in the system between the maximum liquid level of vessel 4b and closed valve 2d expands to provide feed pressure to pump/motor 8 for this phase. After liquid vessel 4a is fully charged and liquid vessel 4b is depleted, valves 2c and 11c are shut and valves 11b and 5 are opened. Pump/motor 7 acting as a pump then charges liquid vessel 3b in a like fashion. Complete charging is finished when liquid vessel 3a is full. Charging of liquid vessel 3a is accomplished by reversing flow in the manner described for the charging of liquid vessel 4a. Discharging (i.e., power extraction) is accomplished by reversing the process in the same step fashion.

By separating the gas side and the liquid side, and further separating the liquid side into several pressure-optimized portions instead of a single vessel, all of the liquid and gas is contained in vessels, each of which is optimized in structure, weight, and cost for the pressure range it is designed to accommodate. The total energy delivery of the entire system can be equal to the energy delivery of a larger traditional accumulator, yet will weigh and cost less.

Another advantage of the present invention is safety in the case of a catastrophic failure of the gas or liquid vessel. Since the pressurized liquid and gas are contained in separate vessels, a rupture would likely involve only one vessel rather than the entire stored volume, thus limiting the amount of energy released in such an event. Furthermore, shut-off valves prevent release of most fluid or gas from vessels that remain intact.

Another advantage of the invention is that the multiple vessel design allows for more flexibility in the packaging of the system in a vehicle.

The present invention separates the gas side into isolatable portions (for safety improvement) and the liquid side into subportions specifically designed to allow a match between pressure range and vessel specifications over pressure ranges smaller than the entire system pressure range (for safety improvement, weight and cost reductions). This novel design of the accumulator system allows reduction in the volume of hydraulic fluid required for a given system capacity, thereby providing additional weight, space and cost savings.

The valving arrangement in conjunction with the multiple vessel design also leads to inherent safety from wholesale fluid or gas release in the case of a rupture, since shut-off valves will isolate the ruptured vessel(s).

While it is expected that the savings in weight can be achieved in part by use of composite materials, the major portion of the expected savings in weight is due to the optimization of individual vessel strength with respect to anticipated pressure range. Accordingly, the pressure vessels, both gas and liquid, can be of conventional or composite construction and of any configuration, including conventional cylindrical or spherical construction or even a more radical small-tube-based design, without forgoing the advantage of reduction in over-all system weight afforded by the present invention.

To further reduce weight and save cost, instead of the conventional approach of designing, for safety reasons, the pressure vessels to a "burst strength" sufficient to withstand pressures several times the maximum specified pressure, an alternative approach is to use pressure vessels built to "just over" the maximum specified pressure (e.g., 1½ times the maximum specified pressure). These vessels would then be wrapped in an energy absorbing "blanket," which would also serve as thermal insulation to reduce heat losses from the warmed gas after compression for better charge/release efficiency. A further third level containment structure would enclose the vessels on the five sides exposed to the vehicle while open on the "underside" to the road to direct released gas expansion energy in that direction. The danger of rupture in a vehicle crash with compressed inert gas (e.g., nitrogen)

dictates only management of the discharged energy, in contrast to the rupture of a compressed gaseous fuel wherein the potential for ignition becomes the principal safety concern.

Thus, all of the pressure vessels in the foregoing embodiments may have a composite construction, for example a thin aluminum shell wrapped in Kevlar or another composite material. This minimizes the weight of the vessels and allows unconventional shapes and configurations that are not possible with conventional construction. An example would be a pressure vessel that is composed of several thin tubes rather than the typical cylindrical or spherical shape, providing packaging benefits for use in a vehicular application, allowing it to be integrated into odd "leftover" spaces in an automotive body.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

We claim:

1. A hydraulic accumulator system for alternately storing energy in the form of gas pressure and converting the stored energy into work by gas expansion, said hydraulic accumulator system comprising:

a high-pressure reversible fluid drive unit operable in a motor mode to produce work and operable in a pump mode;

gas pressure storage means including at least one gas vessel;

a bank of high-pressure liquid vessels connected in parallel between and providing fluid communication between said high pressure reversible fluid drive unit and said gas pressure storage means;

a low-pressure, reversible fluid drive unit operable in either a motor mode or a pump mode, said low-pressure reversible fluid drive unit having a peak efficiency at a discharge pressure head substantially below the discharge pressure head for peak efficiency of said high-pressure reversible drive unit;

a bank of low-pressure liquid vessels connected in parallel between and providing fluid communication between said low pressure reversible fluid drive unit and said gas pressure storage means; and a liquid reservoir for receiving fluid from said high-pressure bank through said high pressure fluid drive unit operating in the motor mode, for receiving fluid from said low-pressure bank through said low-pressure fluid drive unit operating in motor mode, for supplying fluid to said high pressure bank through said high pressure fluid drive unit operating in the pump mode and for supplying fluid to said low pressure bank through said low pressure fluid drive unit operating in the pump mode.

2. The hydraulic accumulator system of claim 1 wherein all of said high-pressure liquid vessels and said low-pressure liquid vessels have different pressure capacities.

3. The hydraulic accumulator system of claim 1 wherein said gas pressure storage means includes a plurality of gas vessels connected in parallel with said high-pressure and low pressure banks of liquid vessels.

4. A hydropneumatic drivetrain for a vehicle comprising:

a pair of drive wheels for propelling the vehicle;

a high pressure, reversible fluid drive unit operable in a motor mode to drive said drive wheels and operable in a pump mode;

gas pressure storage means including at least one vessel;

a bank of high-pressure liquid vessels connected in parallel between and providing fluid communication between said high pressure reversible drive unit and said gas pressure storage means;

a low-pressure, reversible drive unit operable in either a motor mode or a pump mode, said low-pressure reversible fluid drive unit having a peak efficiency at a discharge pressure head substantially below the discharge pressure head for peak efficiency of said high-pressure reversible drive unit;

a bank of low-pressure liquid vessels connected in parallel between and providing fluid communication between said low-pressure fluid drive unit and said gas pressure storage means; and a liquid reservoir for receiving fluid from said high-pressure bank through said high-pressure fluid drive unit operating in a motor mode, for receiving fluid from said low-pressure bank through said low-pressure fluid drive unit operating in a motor mode, for supplying fluid to said high pressure bank through said high-pressure fluid drive unit operating in the pump mode and for supplying fluid to said low-pressure bank through said low-pressure fluid drive unit operating in the pump mode.

5. The hydropneumatic drive train of claim 4 wherein all of said high-pressure liquid vessels and said low-pressure liquid vessels have different pressure capacities.

6. The hydropneumatic drivetrain of claim 4 wherein said gas pressure storage means includes a plurality of gas vessels connected in parallel with said high-pressure and low-pressure banks of liquid vessels.

7. A method of operating a hydraulic accumulator system to produce work comprising:

pumping liquid, using a first reversible pump/motor operating as a pump, from a liquid reservoir into, in succession, a plurality of parallel liquid vessels, filling a first of said liquid vessels while raising the pressure within said first liquid vessel from a first pressure to a second pressure higher than said first pressure and then filling a second liquid vessel to a third pressure higher than said second pressure;

said filling of said liquid vessels displacing gas from said liquid vessels into a gas reservoir and compressing the gas in said gas reservoir;

reversing said first reversible pump/motor for operation as a motor and allowing the compressed gas to expand and to force liquid from second liquid vessel and then, in succession, from said first liquid vessel, through said first reversible pump/motor to drive said first reversible pump/motor operating in said motor mode to produce work.

8. A method in accordance with claim 7 further comprising:

pumping liquid, using a second reversible pump/motor operating as a pump, from the liquid reservoir to fill a third liquid vessel to a fourth pressure higher than said third pressure and, subsequently, to fill a fourth liquid vessel to a fifth pressure higher than said fourth pressure, to displace gas from said third and fourth vessels and to further compress the gas in the gas reservoir;

prior to said reversing said first reversible pump/motor, reversing said second reversible pump/motor for operation as a motor and allowing the compressed gas to expand and to force liquid from the fourth liquid vessel and then, in succession, from the third liquid through said second reversible pump/motor operating as a motor to produce work;

said second pump/motor operating as a pump to discharge liquid over a pressure range from said fifth pressure to said third pressure and said first pump/motor operating as a pump to discharge liquid over a pressure range from said third pressure to said first pressure.

9. A method in accordance with claim 7 wherein the first reversible pump/motor is connected to drive wheels of a vehicle, said method further comprising:

responsive to braking of the drive wheels, driving the first reversible pump/motor as a pump by rotation of the drive wheels.

\* \* \* \* \*